Dec. 2, 1958      J. DELISO      2,862,745
SOCKET AND ROD COUPLING
Filed July 20, 1956
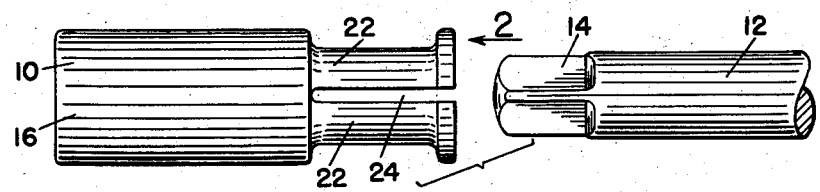
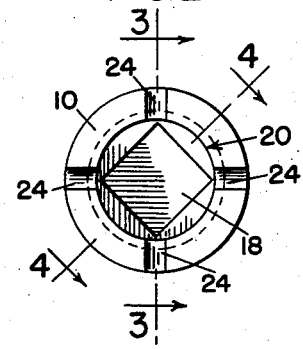
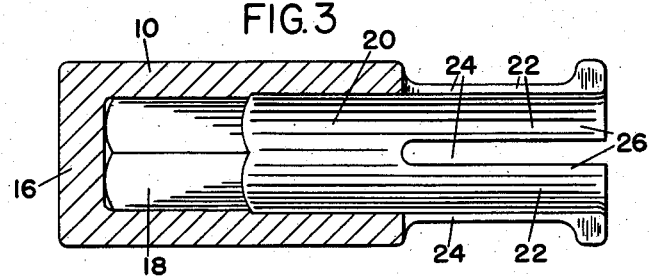
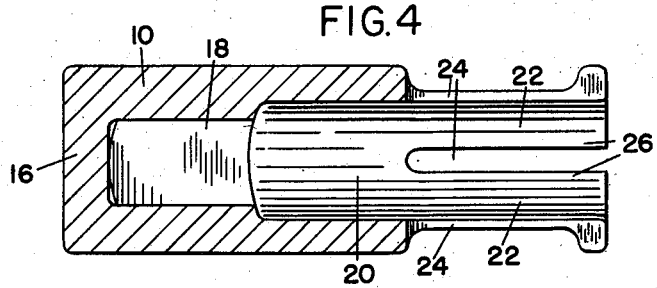
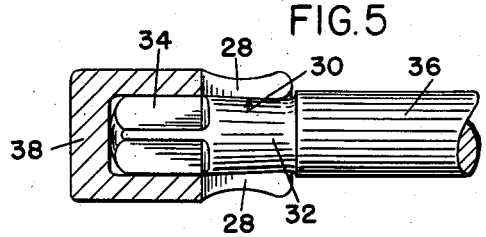
INVENTOR
JOHN DELISO
ATTORNEY United States Patent Office 2,862,745
Patented Dec. 2, 1958

2,862,745
SOCKET AND ROD COUPLING
John Deliso, Worcester, Mass.
Application July 20, 1956, Serial No. 599,223
3 Claims. (Cl. 287—126)

This invention relates to a new and improved coupling particularly adapted for releasably securing a rod to a socket, whether the socket be used as a wrench, as a rod extension, or as a thimble in a handle for interchangeable tools, or in any other form or relationship desired; however, the principal object of the present invention includes the provision of the new and improved coupling principally for use in a socket wrench, the construction being such as to avoid the use of the conventional spring-pressed ball or detent.

Other objects of the invention include the provision of a coupling comprising a socket having an open end and a closed end, the closed end portion having a non-circular driving portion for cooperation with a corresponding non-circular driving portion on the end of a rod or the like, and at the open end thereof, said socket or thimble is provided with a series of annularly arranged longitudinally extending spring fingers which may be formed as an integral part of the socket or thimble and being longitudinally slit at spaced locations thereon to form the fingers, said fingers lightly and frictionally but non-positively griping the rod at a point spaced from the non-circular rotative driving portion thereof, whereby the rod will drive the socket or thimble or vice-versa without any liability of accidental removal of the parts but wherein at the same time these parts are quickly and easily detachable due to the nature of the light frictional retention of the rod by the spring fingers.

Other objects and advantages of the invention will appear hereinafter.

Reference is to be had to the accompanying drawings, in which:

Fig. 1 is a view illustrating one form of socket and rod connection;

Fig. 2 is an end view of the socket on an enlarged scale, looking in the direction of arow 2 in Fig. 1;

Figs. 3 and 4 are sectional views on line 3—3 of Fig. 2; and

Fig. 5 is a sectional view illustrating a modification.

In Fig. 1 there is shown a socket or thimble 10 which may be used per se or which may be inserted in a handle member as is well known in the art. A rod 12 is also shown, said rod having a non-circular driving end 14. This driving end may assume any non-circular shape for driving purposes with respect to the socket 10 but in this case it is shown as being square. The socket 10 may be knurled or plain, or it may be used as a socket wrench, ratchet wrench, or as a shank holder for any kind of tool, etc.

The construction of the socket 10 is best shown in Figs. 2 and 3 and this socket comprises a generally cylindrical member which is hollow having a closed end at 16. Adjacent the closed end 16, this socket is provided with a non-circular driving portion 18 corresponding to the shape of the end 14 or rod 12. By this means, when the rod is inserted in the socket, the two members 10 and 12 are rotatively fixed so that one may drive the other.

Forwardly of the non-circular socket portion 18, the socket 10 may be circular in shape as at 20 to accommodate the cylindrical shape of the rod 12. Extending longitudinally from the open end of the socket 10, there are a plurality of annularly arranged spring fingers which are indicated at 22 and these fingers may conveniently be formed from the same piece of material as the socket 10 by forming longitudinal slits 24 in a reduced annular portion at the open end of the socket. It will be seen that these fingers are resilient and also that they provide relatively long straight interior sections or surfaces as at 26 for the purpose of frictionally gripping the shank portion of the rod 12 just to the right of the driving end 14 in Fig. 1.

The rod 12 is easily insertable between the spring fingers which lightly resiliently grip the same, and when the non-circular portion 14 reaches the non-circular portion of the socket at 18, a very slight turn of the rod is all that is necessary to align the respective portion thereof so as to enter the non-circular portion 14 into the non-circular socket 18.

In this condition, the socket may be used to rotate the rod and vice-versa, and the fingers 22 yieldably frictionally maintain the rod in its seated position. At the same time, however, the rod is quickly and easily removed without the necessity of using an excess of force and without the necessity of displacing a detent or other mechanical means. Also, the elongated surfaces 26 in gripping the shank of the rod hold the same against wabbling so that the rod and the socket are held together in firmly fixed position laterally as well as rotatively.

In Fig. 5, there is shown a modification wherein the spring fingers 28 are formed to extend radially inwardly slightly as at 30 to conform to a tapered portion 32 between the non-circular portion 34 at the end of the rod 36. Otherwise the socket 38 may be similar to that at 10 including the non-circular portion therein accommodating the non-circular portion of the rod 34. In this case, the pieces are held against axial displacement a little more firmly but still non-positively, the holding portion being frictional.

It will be seen that this invention provides a relatively simple and easily operated coupling of the class described and that it does away completely with the conventional spring-pressed detent construction. It will be seen that one of the advantages of the present invention resides in the fact that the rod contains no moving parts whatsoever and therefore it is less expensive to manufacture sets of tools with a single handle and a plurality of removable shanks since the shanks need not be provided with any movable parts such as the conventional spring-pressed ball or detent.

Further, a much more positive drive is presented herein than is possible in the usual spring-gripped shank, and a great deal more force can be applied to the wrench or other tool than in prior art constructions.

Having thus described my invention and the advantages thereof, I do not wish to be limited to the details herein disclosed, otherwise than as set forth in the claims, but what I claim is:

1. A coupling comprising a socket member and a rod to be axially applied thereto and releasably secured therein, said rod having a non-circular rotatively driving portion thereon for entry into the socket member, and a corresponding non-circular rotatively driving portion in the socket for reception thereof whereby the rod or socket member is selectively used to rotatively drive the other, said rod being generally cylindrical, and longitudinally extending spring fingers on said socket member, said spring fingers being generally arranged on a circle conforming to the cylindrical portion of the rod and holding the same lightly frictionally against accidental axial uncoupling, the cylindrical portion of the rod having a diameter slightly greater than the internal diameter of the spring fingers.

2. A coupling comprising a socket member and a rod to be axially applied thereto and releasably secured therein, said rod having a non-circular rotatively driving portion thereon for entry into the socket member, and a corresponding non-circular rotatively driving portion in the socket for reception thereof whereby the rod or socket member is selectively used to rotatively drive the other, said rod being otherwise generally cylindrical, and a series of integral spring fingers of reduced section extending from the open end of the socket, said spring fingers being arranged in cylindrical form at the interior thereof and on a lesser diameter than the diameter of the cylindrical part of the rod.

3. The coupling of claim 2 including enlargements at the ends of the spring fingers.

References Cited in the file of this patent

UNITED STATES PATENTS

| | | |
|---|---|---|
| 686,424 | Smith | Nov. 12, 1901 |
| 1,199,555 | Jeffries et al. | Sept. 26, 1916 |
| 2,450,529 | Sprigg | Oct. 5, 1948 |
| 2,475,608 | Gasparich | July 12, 1949 |
| 2,653,030 | Van Guilder | Sept. 22, 1953 |
| 2,699,347 | Donges et al. | Jan. 11, 1955 |